Patented May 5, 1953

2,637,664

UNITED STATES PATENT OFFICE 2,637,664

COATING ARTICLES WITH AN OLEFIN-SULFUR DIOXIDE RESIN

John F. Howe, Bartlesville, Okla., assignor to Phillips Petroleum Company, a corporation of Delaware No Drawing. Application June 23, 1949, Serial No. 100,975

11 Claims. (Cl. 117—148)

This invention relates to an improved process for coating articles with a heteropolymeric resin prepared by reacting together one or more unsaturated organic compounds and sulfur dioxide. By the process of this invention such a resin is produced as finely dispersed particles suspended in an aqueous medium, and this dispersion is used to produce a firmly bound and continuous coat on the surface of various articles.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins, cyclo-olefins, substituted aliphatic olefins such as styrene, diolefins such as butadiene, isoprene, cyclohexadiene, and the like, acetylenes and polyfunctional unsaturated compounds such as allyl alcohols, vinyl acetate, allyl ethyl ether, o-allylanisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

A method has been found whereby unsaturated organic compounds and sulfur dioxide are caused to react to produce resinous products of varied properties and wide adaptability, said products being readily freed from unreacted reactants and other impurities. The process comprises reacting the unsaturated compound and sulfur dioxide in aqueous emulsion in the presence of suitable catalysts and emulsifying agents. When the reaction is carried out in aqueous emulsion the material remains in a fluid condition and can be agitated readily, thus maintaining adequate contact of the reactants at all stages of the conversion. The resinous product, which is obtained in the form of an emulsion, can be stripped with steam to remove unreacted sulfur dioxide, unreacted olefin, and other volatile impurities.

One of the important fields in which latices of resinous materials in general have found favor during recent years is the coating and impregnation of textiles and paper to increase their usefulness and impart new and improved properties to such materials. The use of latices of other resinous materials for such purposes is well known. However, processes previously employed in the art for coating and impregnating materials with latices have failed to produce satisfactory products when applied to olefin-sulphur dioxide resin latices on account of certain peculiar properties of such latices. Methods previously proposed for coating with these resins involve the application of a solution of olefin-sulfur dioxide resin in an organic solvent, followed by evaporation of the said solvent.

I have now found a novel process for coating and impregnating textiles, paper, and the like with olefin-sulfur dioxide resins wherein valuable products are obtained more efficiently and safely than with prior methods employing solutions of these resins.

In a preferred form the process of my invention comprises production of an olefin-sulfur dioxide resin latex by emulsion polymerization, neutralization of the latex with an alkaline material to a pH of from 6 to 9, coating a material, such as a textile or paper, with this latex, by any suitable means, heating the coated material to substantially dry the resin, and further heating at a carefully regulated elevated temperature to bind the resin and base material.

An object of this invention is to coat articles with a resin formed by copolymerization of sulfur dioxide with a unsaturated organic compound.

Another object of my invention is to form a smooth, tightly bonded resinous coating on the surface of such materials as textiles, paper, wood, and the like.

A further object of my invention is to provide an improved process for coating articles with a heteropolymeric olefin-sulfur dioxide resin.

Further objects and advantages of this invention will become apparent, to one skilled in the art, from the accompanying disclosure and discussion.

In the emulsion copolymerization of sulfur dioxide with unsaturated organic compounds the sulfur dioxide is divided between the aqueous and non-aqueous phases, but a substantial portion of it remains in the aqueous phase which, of course, is quite acidic. In order to insure efficient and rapid reaction of the sulfur dioxide and unsaturated organic compound, sufficient sulfur dioxide should be present to provide a molecular equivalence of sulfur dioxide with the amount of unsaturated organic compound which reacts and, in addition, to maintain a substantial concentration in the aqueous phase. After the desired degree of reaction has been obtained, usually between 70 and 97 per cent of completion of the amount theoretically possible, the bulk of unreacted sulfur dioxide and any unreacted unsaturated compound is removed from the resulting emulsion, or latex. When the unsaturated material is sufficiently low-boiling, this may be done by a simple vaporization step. When the organic material is relatively nonvolatile, the reaction should be permitted to go to as near completion as possible, to eliminate unreacted organic material from the resulting mixture.

After removing the bulk of the unreacted sulfur dioxide from the emulsion obtained after the reaction, the aqueous medium is still acidic. The acid nature of latices of such resins would appear to render such a latex undesirable for use in treatment of a textile because these latices attack textiles or paper when using them for impregnation, resulting in weakening and discoloration. However, I have found that this apparent deficiency in these resin latices can be completely obviated by adjusting the pH to a substantially neutral or slightly alkaline value, with no deleterious effects on the quality of the latex or the resin. This pH may be adjusted in the range from 3 to 9, preferably from 4 to 8, by the addition of a small amount of an alkaline material, such as an aqueous solution of sodium hydroxide, ammonium hydroxide, or the like. The textiles and papers treated with such a latex have increased strength and good color.

The coating of the material to be treated with latex may be accomplished by any suitable means, such as by dipping, the use of a spreader bar, doctor blade, spray applicator, or the like.

After the latex, or emulsion, has been applied to the surface of the article to be coated, the coating is dried. This should usually be carried out at a temperature sufficiently low as to avoid mechanical damage to the resin or resin coating, such as damage resulting from forming blisters under a continuous film or separation of resin particles from the coated article. Such damage results from too rapid an evaporation of water, as when heat is rapidly supplied at the boiling temperature of water under the existing pressure; therefore lower drying temperatures than this should be used. With latices of resins of high melting point, such as produced from sulfur dioxide and unsaturated hydrocarbons having three to six carbon atoms per molecule, and when operating at atmospheric pressure, the drying temperature is usually from about 175 to about 210° F.; with latices of resins of lower melting point, such as are produced from sulfur dioxide and unsaturated organic compounds having a large number of carbon atoms per molecule, and for resins produced from unsaturated organic compounds containing various modifying groups such as carbonyl, etc., and for latices of resins which have been plasticized, the drying can be conducted at a lower temperature. After the coated article is dry, the temperature is then maintained at such a level that the resin softens or melts, and becomes firmly bonded to the article and also forms a uniform film.

The temperatures employed in the binding step of my process are a critical factor in the production of high quality products. The resin must be fused in order that the coating itself is rendered homogeneous and also is bound firmly to the fibers of the base material. However, the temperature level employed should usually be maintained below that at which decomposition of the resin occurs. When operating in this manner smooth, evenly coated products are obtained which can be cut and processed, as in the production of laminates, without damage or separation. The temperatures which may be employed in this step vary of course, with the particular resin employed, but in general are above the minimum molding temperature of the resin, and lie in the range from 100 to 350° F., although higher or lower temperatures may be employed in some cases. The minimum molding temperature of a resin from sulfur dioxide and 1-butene is about 195 to 200° F., and of a resin from sulfur dioxide and 1-octene is about 135° F. The average minimum molding temperatures for other olefin-sulfur dioxide resins include 190° F. for a resin produced from a mixture of equal weights of 1-butene and 1-octene, 190° F. for the resin from 1-pentene, 220° F. for 2-pentene, 170° F. for 1-hexene, and 80° F. for 1-dodecene. These temperatures are for unplasticized resins. Thus, a textile treated with an unplasticized resin latex prepared from 1-butene and sulfur dioxide must be heated in the temperature range from 210° F. to 310° F., preferably from 230° F. to 275° F., while if this resin, in the latex-form, has been suitably plasticized it may be heated no higher than about 150° F. Too low a temperature fails to fuse and bind the resin and the textile, while higher temperatures cause increasing formation of gaseous decomposition products of the coating. After a textile has been coated, dried and bound to the resin, the process may be repeated, if desired, to build up successive layers of resin. The material is held at such a temperature for from about one minute to one hour; usually holding the material at this temperature for only a few minutes is satisfactory.

The coated and impregnated materials of my invention have important potential uses. Strong and inexpensive laminates are easily produced from previously coated papers, textiles, wood sheets, and the like, by the application of heat and pressure, and the heating step can be that which is a part of a lamination process. Papers which have been impregnated with these resins have markedly increased tear resistance.

Unsaturated organic compounds which are applicable in this invention are those which will react with sulfur dioxide to produce heteropolymeric compounds, under the other conditions heretofore employed by the prior art. Most of such reactants contain an olefinic linkage, and may be represented by the formula

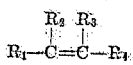

wherein $R_1$ and $R_2$ may be hydrogen, halogen, or alkyl, or $R_1$ may be a constituent of a carbocyclic ring in which $R_4$ is a member, and $R_3$ and $R_4$ may be hydrogen, alkyl, alkenyl, aryl, aralkyl, or have an acetylenic linkage, or substituted groups thereof wherein substituents such as halo, nitro, hydroxyl, carbocyclic, cyano, and the like may be present, or $R_4$ may be a constituent of a carbocyclic ring in which $R_1$ is also a member. In general the olefinic compound employed will not contain more than twenty carbon atoms per molecule. Examples of olefinic compounds which may be used include 1-butene, 2-butene, propylene, isobutylene, pentenes, hexenes, cyclohexene, butadienes, styrene, alpha-methyl styrene, alpha-chloro styrene, vinyl acetylenes, vinyl chloride, vinyl bromide, and the like. It is also frequently desired to employ a mixture of olefinic compounds, rather than a single olefinic compound, in carrying out the process of this invention.

When operating according to the manner herein described it is generally found that substantially equimolar proportions of olefinic compound and sulfur dioxide react together. However, it is sometimes desired to use a molar excess of sulfur dioxide, say a 2:1 mol ratio of sulfur dioxide to olefinic material. In some cases it may even be desirable to use a higher ratio of the one reactant to the other, for example, a ratio of 5:1, or greater, depending upon operating conditions, olefinic material employed, amount of aqueous medium, etc., although it appears that, even in such cases, equimolar quantities of sulfur dioxide and olefinic compound enter into reaction. Frequently it will be desirable to remove the reactants from the reaction zone, and separate unreacted materials, when between about 70 and about 97 per cent of the reactant present in the lesser amount has reacted. When some diolefins are used as reactants, under some conditions, these materials tend to undergo homopolymerization to form rubber-like products; such reactions are undesired in our invention and conditions should be chosen with such diolefinic reactants, to inhibit such homopolymerization and favor joint interreaction to produce heteropolymeric resins.

Emulsifying agents which are applicable are those which are active in an aqueous medium which has a pH below 7. The aqueous medium in the emulsion used generally has a pH of about 1 to 2, and sometimes has a pH as low as about 0.5. The emulsifying agent used should, of course, be effective at the pH of the aqueous medium in the reaction mixture. Among the compounds which have been found effective are the long chain alkyl sodium sulfates and the branched chain aliphatic or aromatic sodium sulfonates, salts of organic bases such as amine salts, and quaternary ammonium salts. Examples of these materials are lauryl sodium sulfate, diamyl sodium sulfosuccinate, di-secondary-butyl naphthalene sodium sulfonate, dodecylamine hydrochloride, dodecylamine sulfate, and the like. The amount of emulsifying agent employed is that quantity which is necessary to produce a stable emulsion of the ingredients. In some cases an amount as low as about 1 part per 100 parts reactants (olefin plus sulfur dioxide) is considered sufficient and usually an amount not to exceed about 10 parts is added.

Catalysts applicable in this process are the same as those which have been found effective when carrying out the reaction between olefinic compounds and sulfur dioxide by methods heretofore employed. Examples of these catalytic materials include nitrates of the alkali metals or ammonium, nitric acid, potassium persulfate, hydrogen peroxide, organic peroxides, such as cumene hydroperoxide, peracetic acid, and the like. The amount of catalyst used may vary over a wide range and will depend upon the material chosen. In cases where alkali metal nitrates or ammonium nitrate are employed, the amount may vary from 0.03 to 0.60 part per 100 parts reactants with an amount ranging from 0.15 to 0.45 part being generally preferred. With other materials the quantity of catalyst used may be somewhat higher but in any event it is determined by the case at hand.

Temperatures for carrying out the resin-producing reactions of this invention will usually fall within the range of about 10 to about 140° F., with the narrower range 50 to 120° F. being most frequently preferred. However, in some instances it may be considered advisable to employ temperatures below 10° F. in order to get a more satisfactory reaction.

Obviously when polymerizations are carried out in aqueous emulsion in the absence of freezing point depressants, temperatures below the freezing point of the acidic aqueous medium cannot be employed. The use of various additive agents, however, makes a process of the type disclosed herein applicable at lower temperatures. An example of such a low temperature system is a glycerin-water solution, and the term "aqueous emulsion" should be construed to include the use of an aqueous medium comprising water and a sufficient amount of a water-soluble component to lower the freezing point below the desired polymerization temperature, whether or not the actual polymerization temperature is above or below freezing. It is generally preferred that the emulsion be of an "oil in water" type, with the ratio of aqueous medium to organic monomeric material between about 1.5:1 and about 10:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

Latices of olefin-sulfur dioxide resins mixed with latices or dispersions of other polymeric materials, such as, for example, an elastomer latex, are also applicable in my invention. Such a mixture is usually made with a ratio, by weight, of resin to elastomer between 3:2 and 99:1. Plasticizers and/or fillers may also be added to the latices involved before applying them to textiles or paper.

Particularly important advangtages of employing latices for coating according to my process instead of solvent solutions are elimination of handling explosive and toxic solvents and, elimination of expensive solvent recovery systems.

Further, suitable solvents which dissolve the sulfur dioxide-olefin resins are limited, and most of those solvents which are otherwise acceptable are commercially undesirable because of their high cost. Perhaps the most significant advantage of my invention, accruing from the discovery of a method of employing latices instead of solutions of olefin-sulfur dioxide resins for impregnation, lies in the fact that these resins may be employed directly in the form in which they are produced. In contrast, when employing solutions of the resin for coating, the polymerization product must be freed of all solvents or diluents employed in the polymerization process, comminuted to suitable form for dissolving and then redissolved in a suitable organic solvent for use in coating.

A further advantage of employing latices according to my invention is the wide range of concentrations and fluidities in which these latices can be provided. Thus, the thickness of the coat applied to the fabric may be easily controlled by varying the concentration of the latex employed.

Advantages of this invention are additionally illustrated by the following examples. The reactants, their proportions, and other specific ingredients of the examples are presented as being typical and should not be construed to limit the invention unduly.

*Example 1*

An olefin-sulfur dioxide resin was prepared in aqueous emulsion using the following recipe:

| | Parts by weight |
|---|---|
| 1-butene | 46.7 |
| Sulfur dioxide | 88.3 |
| Lithium nitrate | 0.5 |
| Sodium di-sec-butyl naphthalene sulfonate | 5.0 |
| Water | 180.0 |

The reactants were emulsified in water and the mixture agitated throughout the reaction period while the temperature was held at 77° F. The reaction was stopped at the end of 2½ hours, and the unreacted sulfur dioxide and olefin were vaporized from the latex. The slightly acidic latex was then neutralized with 1 N sodium hydroxide solution. Analysis showed that the latex so obtained contained 19.3 weight per cent 1-butene-sulfur dioxide resin.

Samples of various materials were dipped in the latex, drained and dried at a low temperature in a forced air oven. The temperature of the oven was then regulated at about 250° F. This temperature was held for about one-half hour to fuse the resin and bind it to the base material.

The following table lists the base materials which were impregnated and shows the per cent resin by weight.

| Base Material | Resin, Weight Percent |
|---|---|
| cotton duck | 28.3 |
| rayon | 37.5 |
| wool | 42.6 |
| kraft paper | 26.5 |

*Example 2*

A 1-butene-sulfur dioxide resin latex was prepared and neutralized in exactly the same manner as described in Example 1. It was then mixed with a previously prepared acrylonitrile-1,3-butadiene elastomer latex in such proportions that 70 parts of the resin were present for every 30 parts of the elastomer present.

Cotton duck was dipped in the latex mixture, drained and dried at a low temperature in a forced air oven. The temperature of the oven was regulated at about 200° F. This temperature was held for a short time after drying to bind the polymers and the cotton duck. A smooth, firmly held coat was bound to the cloth.

*Example 3*

An olefin-sulfur dioxide resin was prepared in aqueous emulsion using the following recipe:

| | Parts by weight |
|---|---|
| 1-octene | 63.6 |
| Sulfur dioxide | 71.4 |
| Soluble ferric pyrophosphate | 0.5 |
| Sodium di-sec-butyl naphthalene sulfonate | 5.0 |
| Water | 180.0 |

The reactants were emulsified in water and the mixture agitated throughout the reaction period while the temperature was held at 86° F. The reaction was stopped at the end of 2 hours, and the unreacted sulfur dioxide was vaporized from the latex. The slightly acidic latex was then neutralized with 5 N sodium hydroxide solution.

Cotton duck was dipped in the latex mixture, drained and dried at a low temperature in a forced air oven. The temperature of the oven was regulated at about 150° F. This temperature was held for a short time after drying to bind the resin and the cloth. A smooth, firmly held, white coat was bound to the cloth.

*Example 4*

A 1-butene-sulfur dioxide resin latex was prepared in aqueous emulsion using the following recipe:

| | Parts by weight |
|---|---|
| 1-butene | 46.7 |
| Sulfur dioxide | 88.3 |
| Lithium nitrate | 0.5 |
| Sodium di-sec-butyl naphthalene sulfonate | 5.0 |
| Water | 100.0 |

The reactants were emulsified in water and the mixture agitated throughout the reaction period while the temperature was held at 86° F. The reaction was stopped at the end of 5 hours, and the unreacted surfur dioxide and olefin were vaporized from the latex. The slightly acidic latex was then neutralized with 10 N sodium hydroxide solution. Analysis showed that the latex so obtained contained 44 weight per cent 1-butene-sulfur dioxide resin.

Cotton duck was dipped in the latex, the excess latex was removed with a doctor knife, and the coated material then dried in a forced air oven. The temperature of the oven was then regulated at about 300° F. This temperature was held for a short time to bind the resin and the cloth. The resultant product was an impregnated and smoothly coated cloth containing 56.4 per cent resin.

*Example 5*

A latex was prepared by the emulsion polymerization of the following recipe:

| | Parts by weight |
|---|---|
| Sulfur dioxide | 88.3 |
| 1-butene | 46.7 |
| Lithium nitrate | 0.5 |
| Emulsifier (sodium Lorol sulfate) | 0.5 |
| Water | 100.0 |

Polymerization was carried out at 86° F. for about 4.5 hours. The warm latex was blown with air at a temperature between 86 and 122° F. to remove residual sulfur dioxide, after which it was neutralized with ammonium hydroxide to a pH of 6.0. The latex was then plasticized with 30 parts, per hundred parts of resin in the latex, of ethyl phthalyl ethyl glycollate (Santicizer E-15). The latex so prepared was found to comprise 60 per cent solids.

Kraft paper strips were dipped in the latex and allowed to drain at room temperature, after which they were dried at various temperatures to determine the optimum procedure for obtaining a satisfactory coating. Drying temperatures and characteristics of the coated strips are tabulated below:

| Sample | Drying Temp. (° F.) | Characteristics of Coating |
|---|---|---|
| 1 | 73 | Rough. Easily cracked or flaked. |
| 2 | 90 | Do. |
| 3 | 105 | Smooth to rough. Some cracking. |
| 4 | 115 | Smooth, flexible, continuous. |
| 5 | 122 | Do. |
| 6 | 140 | Do. |

*Example 6*

A latex was prepared having a pH of 3, and plasticized according to the method described in Example 5. The solids content of this latex was 53 per cent. Portions of the latex were diluted to different solids contents and used for treating samples of cotton cloth (Indian Head).

The cloth samples were weighed, dipped in latex and passed through rolls to remove excess liquid after which they were dried at 150° F. for 10 minutes and weighed. Data on these tests are tabulated below:

| Sample | Latex (Percent Solids) | Resin Incorporated, Weight Percent |
|---|---|---|
| 1 | 20 | 22.6 |
| 2 | 35 | 48.0 |
| 3 | 53 | 62.5 |

Sample 1 was well bodied, quite flexible, and resembled a heavily starched or filled material in appearance. Sample 3 was quite stiff but could be folded or rolled easily. Sample 2 was intermediate in properties. Folding or creasing of the treated cloth did not cause cracking or flaking of the resin.

As will be evident to those skilled in the art, various modifications of this invention can be made, or followed, in the light of the foregoing disclosure and discussion, without departing from the spirit or scope of the disclosure or from the scope of the claims.

I claim:

1. In a process for coating an article with a 1-butene-sulfur dioxide resin, which comprises forming an aqueous emulsion of liquid 1-butene and a molecular excess of sulfur dioxide, subjecting said emulsion to reaction conditions to produce in latex form a heteropolymeric resin from said butene and sulfur dioxide for a time sufficient to effect reaction of 70 to 97 per cent of said butene, vaporizing from a resulting latex unreacted 1-butene and sulfur dioxide, the improvement which comprises in combination the steps; adding to said latex sodium hydroxide in an amount sufficient to raise the pH thereof to between 4 and 8, coating an article with said latex, drying said coated article at a temperature between 150 and 210° F., and subsequently heating said coated and dried article at a temperature between 230 and 275° F. for a period between one minute and one hour.

2. In a process for coating an article with an olefin-sulfur dioxide resin, which comprises forming an aqueous emulsion of liquid mono-olefin hydrocarbon having 4 to 8 carbon atoms per molecule and a molecular excess of sulfur dioxide, subjecting said emulsion to reaction conditions to produce in latex form a heteropolymeric resin from said mono-olefin and sulfur dioxide for a time sufficient to effect reaction of 70 to 97 per cent of said mono-olefin, and vaporizing from a resulting latex unreacted mono-olefin and sulfur dioxide, the improvement which comprises in combination the steps; adding to said latex an alkaline material in an amount sufficient to raise the pH thereof to between 3 and 9, coating a textile with said latex, drying said coated textile, and subsequently heating said coated and dried textile at a temperature below the decomposition temperature of said resin and above its softening temperature for a period between one minute and one hour.

3. The process of claim 1 in which there is admixed with said resin latex, subsequent to neutralization with sodium hydroxide and prior to coating said textile, a latex of a synthetic elastomer prepared by emulsion copolymerization of acrylonitrile and 1,3-butadiene in a ratio of resin to elastomer between 3:2 and 99:1 by weight.

4. The process of claim 1 in which said article is a textile.

5. The process of claim 1 in which said article is a paper.

6. The process of claim 1 in which said article is a wood.

7. In a process for producing a resin-coated article, which comprises forming an aqueous emulsion of 1-octene and a molecular excess of sulfur dioxide, subjecting said emulsion to reaction conditions to produce an emulsified heteropolymeric resin and effect reaction of at least 97 per cent of said 1-octene, and removing unreacted sulfur dioxide from a resulting latex emulsion, the improvement which comprises in combination the steps; adding to said latex an alkaline material in an amount sufficient to raise the pH thereof to between 4 and 8, coating an article with said latex, drying said coated article, and subsequently heating said coated and dried article to a temperature below the decomposition temperature of said resin and above its softening temperature for a period between one minute and one hour.

8. In a process for coating an article with a resin resulting from heteropolymerization of sulfur dioxide and a mono-olefin hydrocarbon having 4 to 8 carbon atoms per molecule, which comprises forming an aqueous emulsion of such mono-olefin and a molecular excess of sulfur dioxide, subjecting said emulsion to reaction conditions to produce an emulsified heteropolymeric resin, removing unreacted material from a resulting emulsion, the improvement which comprises in combination the steps; adding to said emulsion an alkaline material to raise the pH to between 3 and 9, admixing with said latex a plasticizer for said resin, with a ratio of resin to plasticizer between 3:2 and 99:1 by weight, coating a solid article with a resulting neutralized emulsion of plasticized resin, drying said coated article, and heating said dried coated article at 9. In a process for coating paper with a resin, which comprises reacting a normal butene with sulfur dioxide while said butene is dispersed as a liquid in an aqueous medium to produce a latex of a resulting butene-sulfur dioxide resin, and removing unreacted butene and sulfur dioxide from said latex, the improvement which comprises in combination the steps; adding to said latex an alkaline reactant in an amount sufficient to raise the pH thereof to between 4 and 8, coating paper with said latex, drying said coated paper at 150 to 210° F., and subsequently heating said coated and dried paper at 230 to 275° F. for one minute to one hour.

10. A process for coating paper with a resin, which comprises coating paper with a latex comprising an emulsion in water of a heteropolymeric normal butene-sulfur dioxide resin having a pH between 4 and 8, drying said coated paper at 150 to 210° F., and subsequently heating said coated and dried paper at 230 to 275° F. for one minute to one hour.

11. In the coating of an article with an olefin-sulfur dioxide resin prepared by forming an aqueous emulsion of a liquid mono-olefin hydrocarbon having 4 to 8 carbon atoms per molecule and a molecular excess of sulfur dioxide, subjecting said emulsion to reaction conditions to produce, in latex form, a heteropolymeric resin from said mono-olefin and sulfur dioxide for a time sufficient to effect reaction of 70 to 97 per cent of said mono-olefin, vaporizing from a resulting latex unreacted mono-olefin and sulfur dioxide, and which latex as prepared is so acidic as to adversely affect the article to be coated, the improvement, in the application of said resin directly from the latex from which it has been prepared to the said article, which comprises the steps of adding to said latex an alkaline material in an amount sufficient to raise the pH thereof to between 3 and 9, coating an article with said latex, drying said coated article at a temperature between 150° and 210° F., and subsequently heating said coated and dried article at a temperature between 230° and 275° F., for a period between one minute and one hour.

JOHN F. HOWE.

References Cited in the file of this patent

UNITED STATES PATENTS

| Number | Name | Date |
|---|---|---|
| 2,031,929 | Breuers et al. | Feb. 25, 1936 |
| 2,077,133 | Sibley | Apr. 13, 1937 |
| 2,371,719 | Starkweather | Mar. 20, 1945 |
| 2,379,354 | Hilton | June 26, 1945 |
| 2,450,424 | Frey | Oct. 5, 1948 |
| 2,469,847 | De Nie et al. | May 10, 1949 |
| 2,474,350 | Eilerman | June 28, 1949 |
| 2,511,498 | De Nie et al. | June 13, 1950 |
| 2,531,403 | Crouch et al. | Nov. 28, 1950 |

OTHER REFERENCES

J. Am. Chem. Soc., vol. 59 of 1937, pages 707 to 711 incl.